Apr. 17, 1923.
E. H. BELDEN
1,452,263
STEERING MEANS FOR TRACTORS
Original Filed Oct. 9, 1919    7 Sheets-Sheet 2
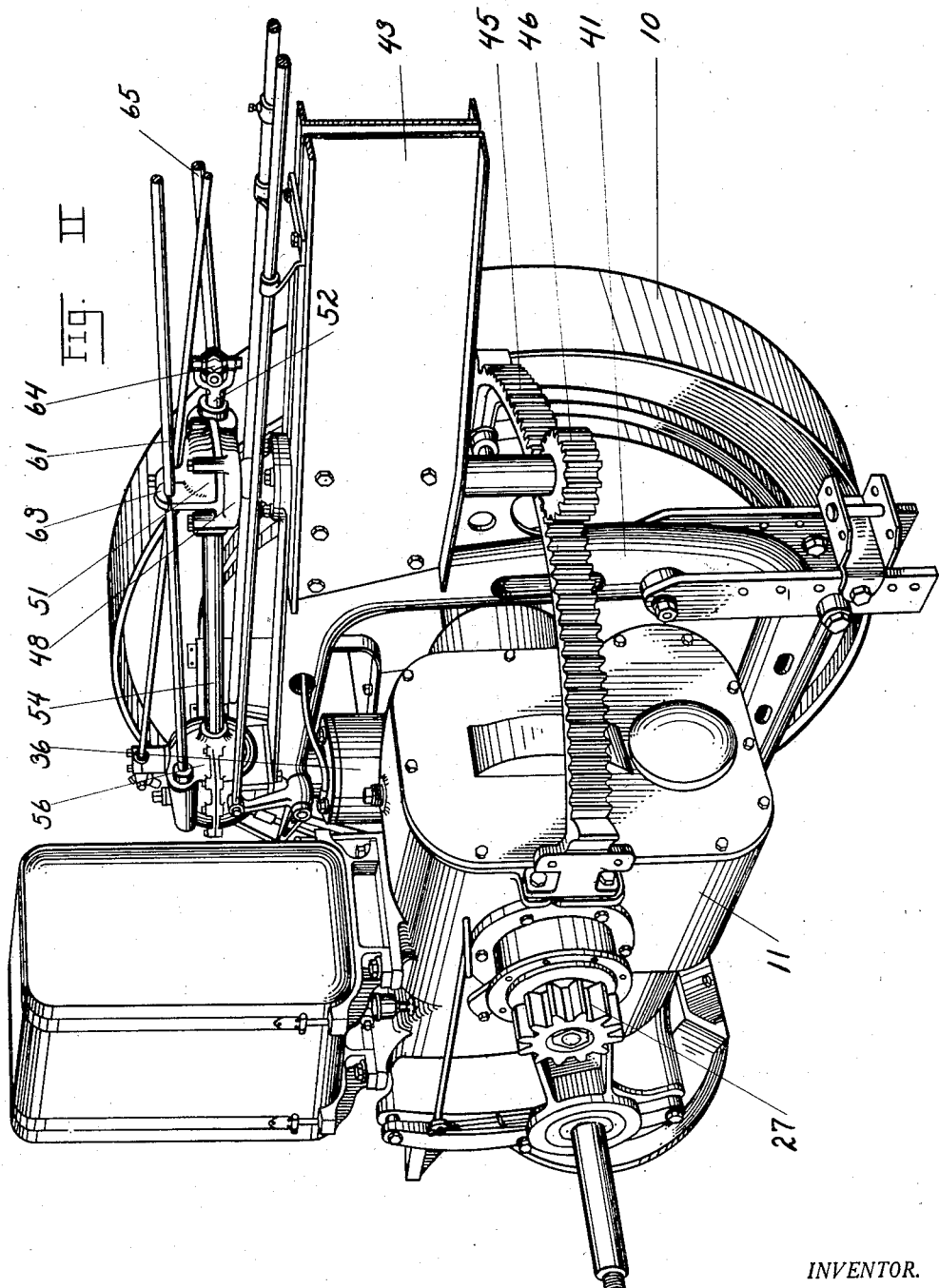
INVENTOR.
Edward H. Belden.
BY Chester H. Braselton
ATTORNEY

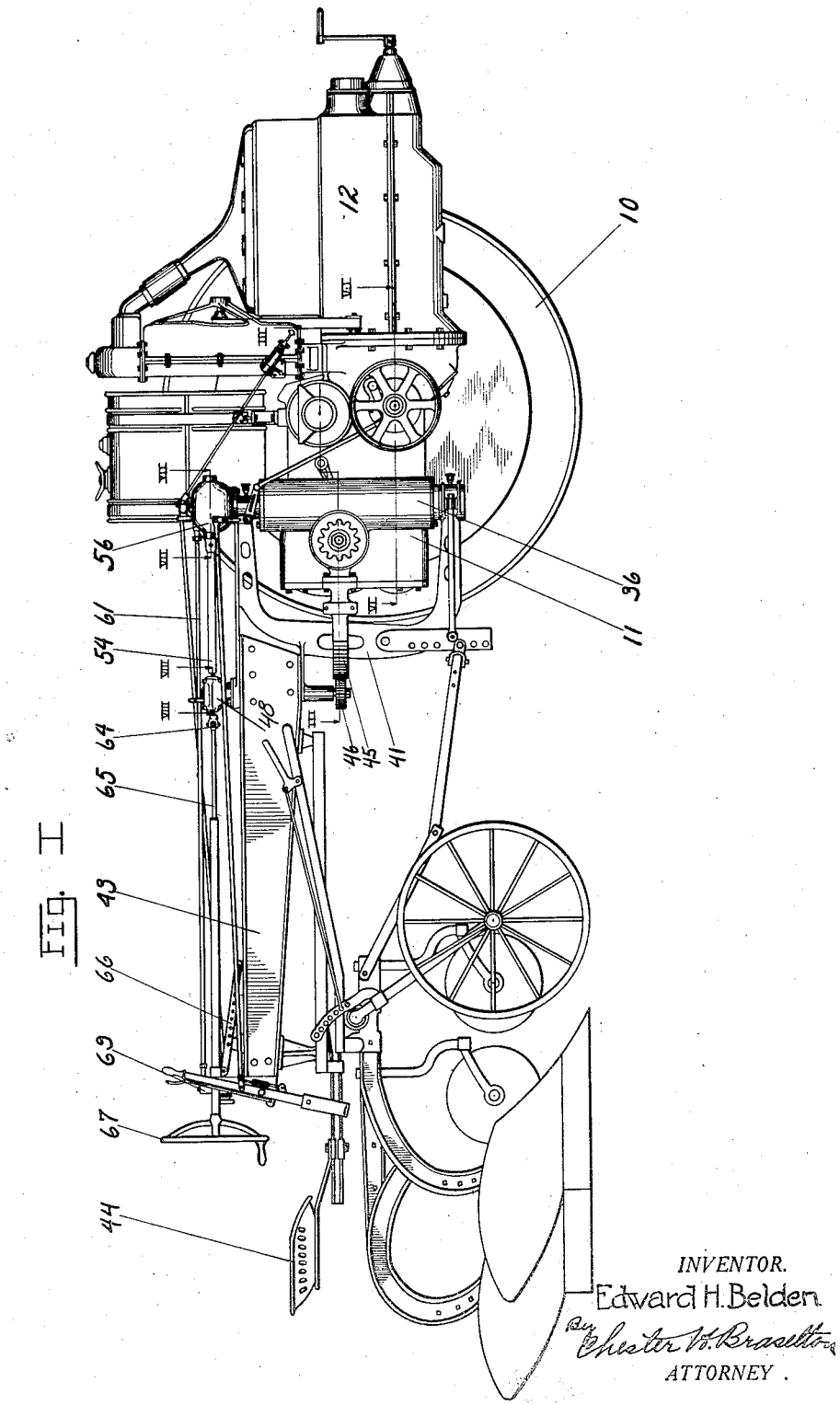

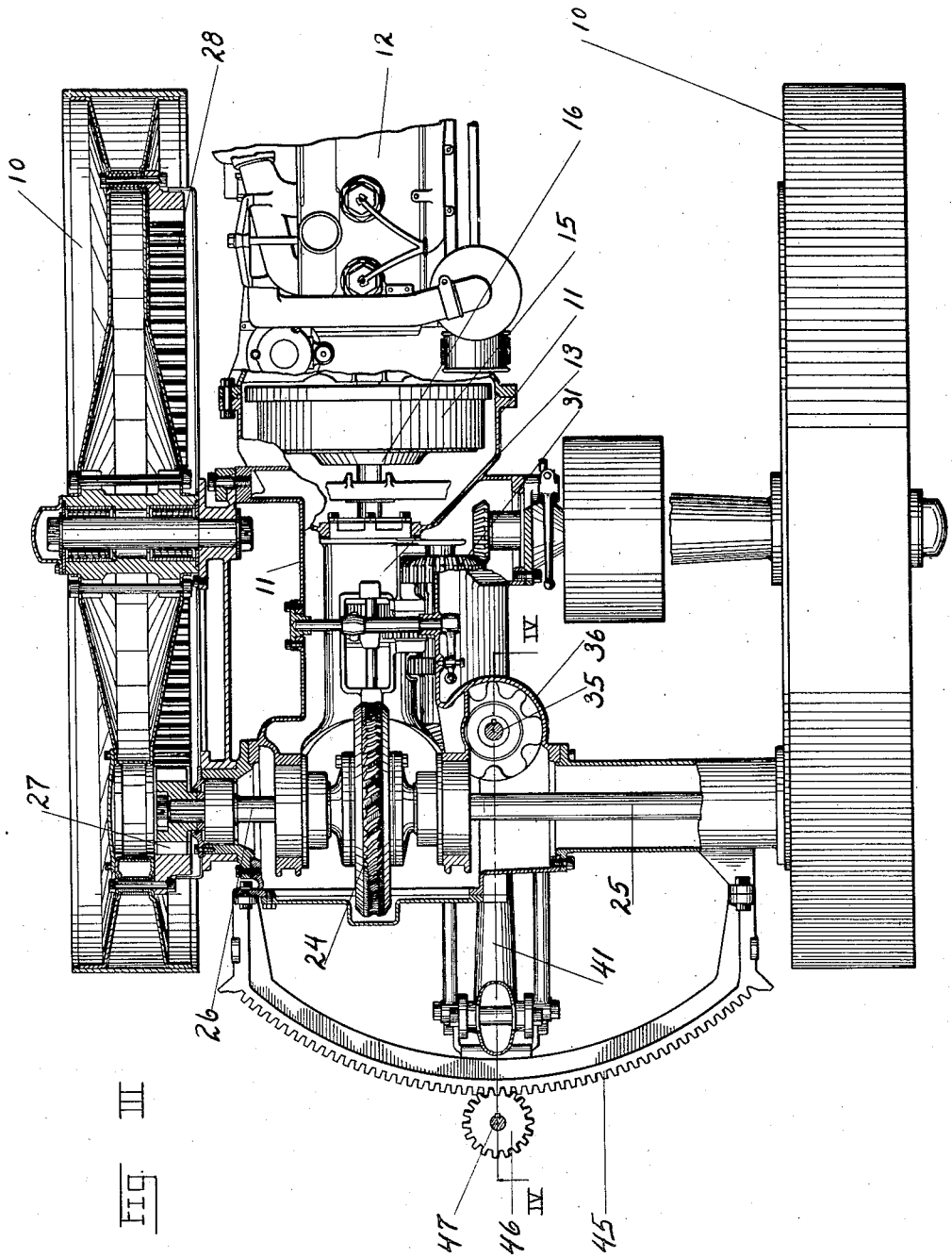

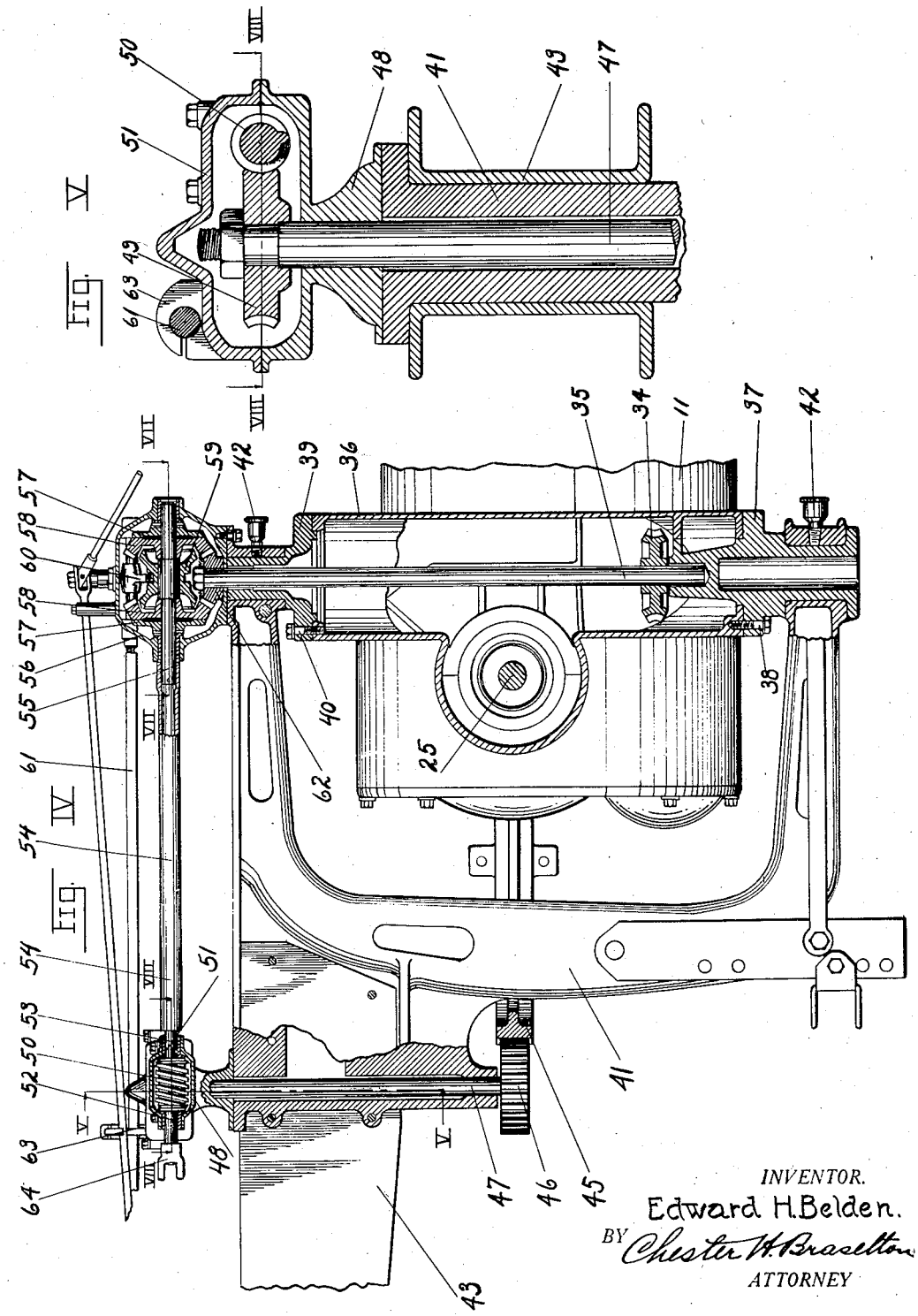

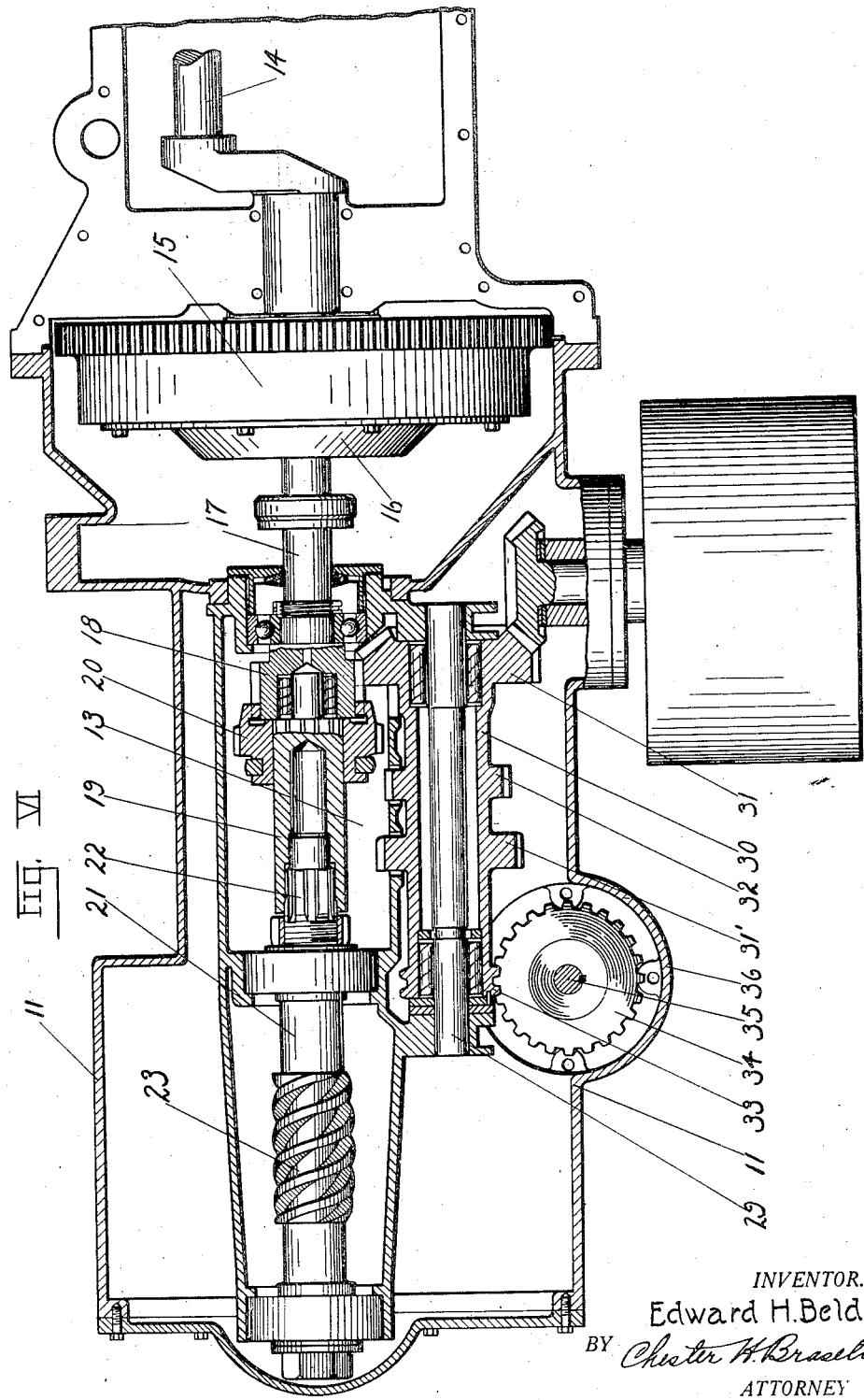

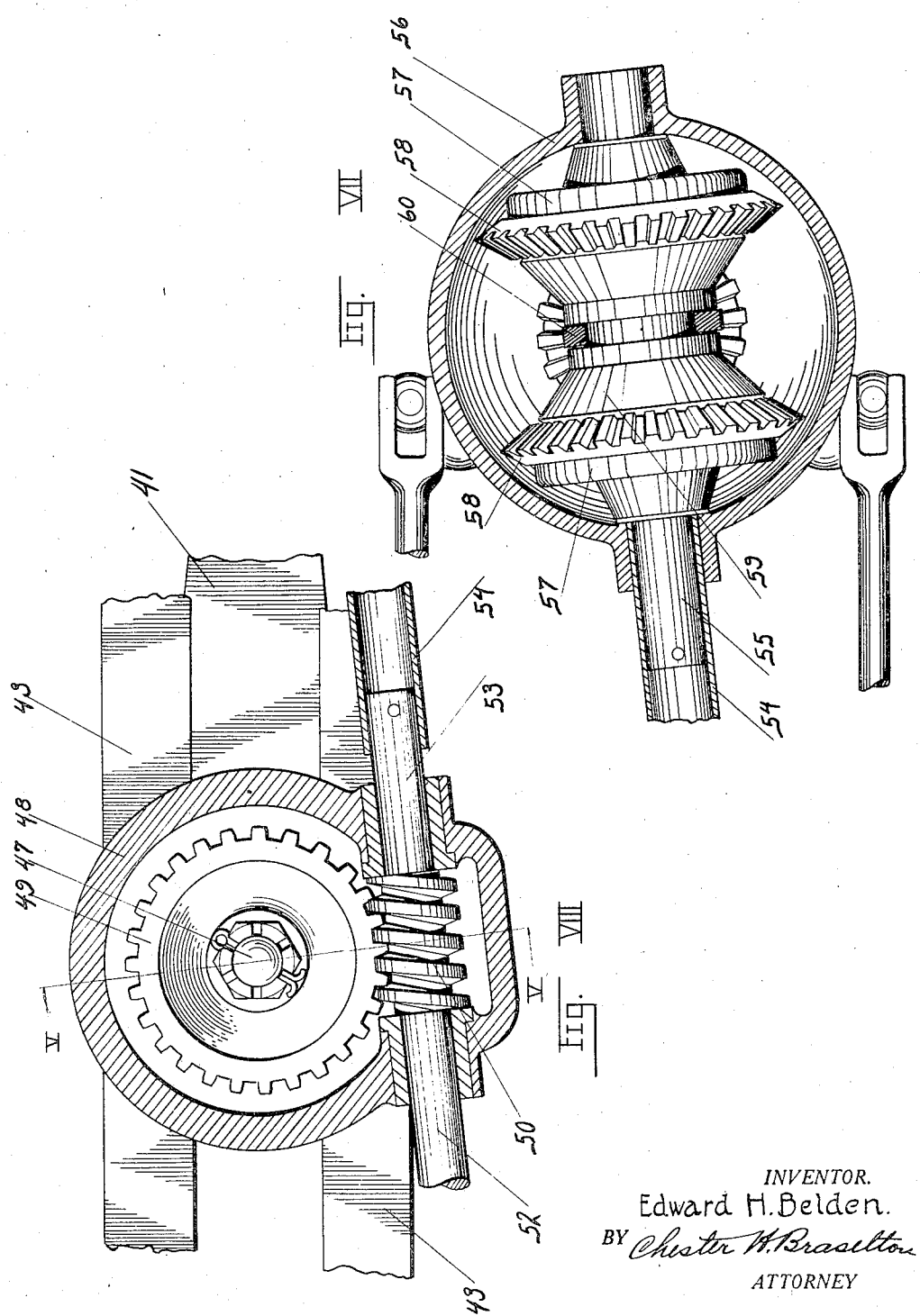

Apr. 17, 1923. 1,452,263
E. H. BELDEN
STEERING MEANS FOR TRACTORS
Original Filed Oct. 9, 1919 7 Sheets-Sheet 7
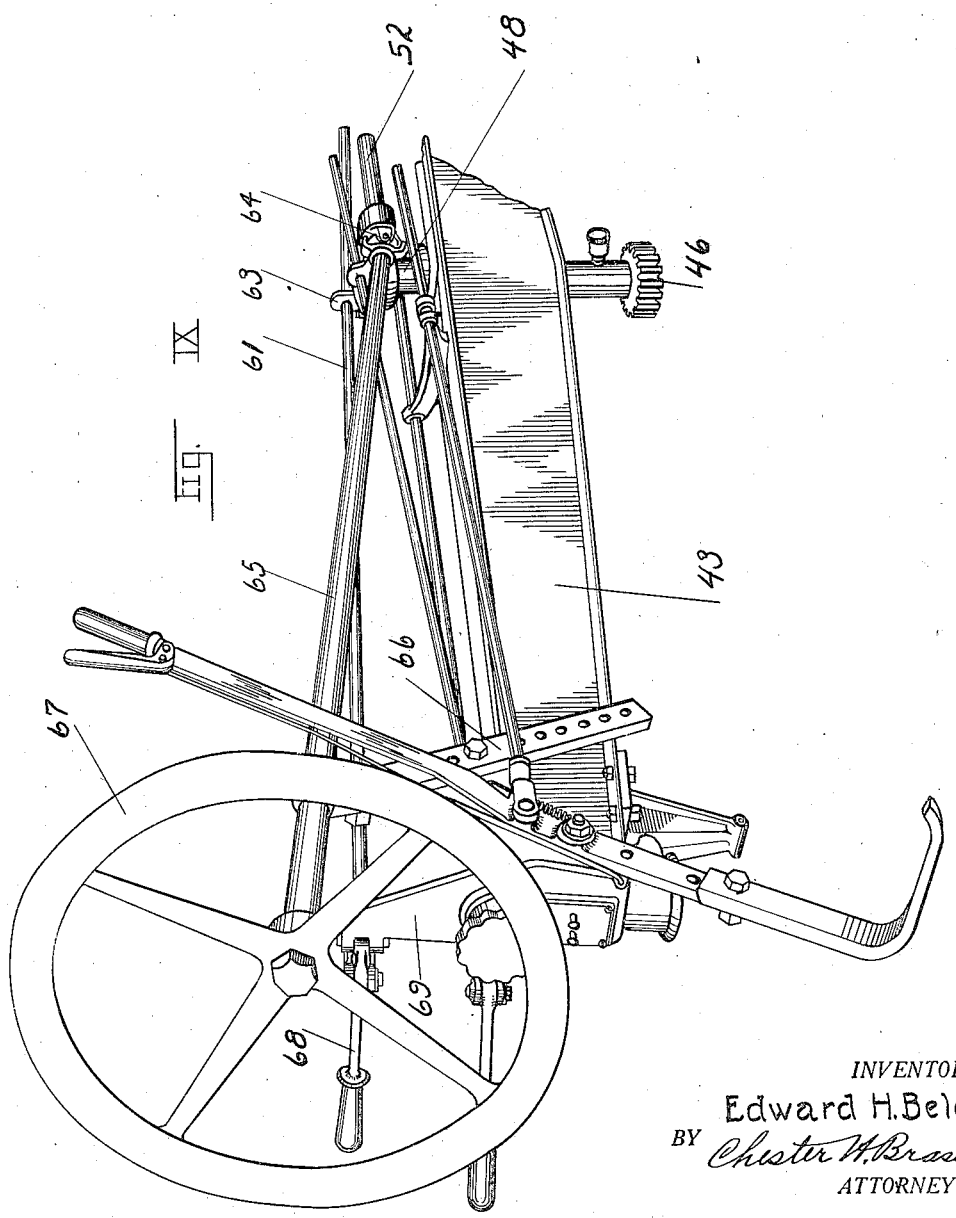
INVENTOR.
Edward H. Belden.
BY *Chester W. Braselton*
ATTORNEY Patented Apr. 17, 1923.

1,452,263

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

STEERING MEANS FOR TRACTORS.

Original application filed October 9, 1919, Serial No. 329,429. Divided and this application filed November 22, 1920. Serial No. 425,899.

*To all whom it may concern:*

Be it known that I, EDWARD H. BELDEN, residing at Toledo, in the county of Lucas and State of Ohio, have invented certain new and useful Improvements in Steering Means for Tractors, of which I declare the following to be a full, clear, and exact description.

This invention relates to improvements in steering means for tractors, particularly tractors of the two wheel type where the weight is practically all supported by the two forward or drive wheels, a trailer being pivoted to swing horizontally with respect to the forward running gear.

One of the objects of the present invention is the provision of a simple power driven steering means, that is, one in which as few parts as possible are employed and in which the parts are readily accessible for repairs or replacements.

Another object is the provision of a combined power driven and manually operable steering mechanism in which either or both driving means may be used interchangeably and without special adjustment.

Other objects, and objects relating to details of construction and economies of manufacture, will appear as I proceed with the description of that embodiment of the invention which, for the purposes of the present application, I have illustrated in the accompanying drawings, in which:

Figure I is a side elevation of a tractor, embodying my invention, one of the drive wheels being removed to more clearly illustrate the invention.

Figure II is a rear perspective of a portion of the tractor with the wheel on the near side removed.

Figure III is a view partly in plan and partly in horizontal section substantially on the line III—III of Figure I, some of the parts being broken away.

Figure IV is a view partly in side elevation and partly in vertical section showing the continuously driven vertical shaft and the steering connections adapted to be operated thereby.

Figure V is a vertical section taken substantially on the line V—V of Figures IV and VIII.

Figure VI is a view principally in horizontal section on the line VI—VI of Figure I, showing the transmission mechanism and the method of driving the steering mechanism therefrom.

Figure VII is a horizontal section taken on the line VII—VII of Figure I, showing in plan the reversing gears and clutch.

Figure VIII is a similar view taken on the line VIII—VIII of Figure I, and showing the worm and worm wheel drive connection to the steering pinion.

Figure IX is a perspective of the rear end of the trailer, showing the mounting for the steering shaft and the control rod which controls the direction of drive and the disconnection of the power steering means, and other control rods.

Like reference characters refer to similar parts throughout the views.

In the drawings, 10 represents the drive wheels. These wheels are mounted upon axles which are supported in any suitable manner upon a casing 11 in which is enclosed, or to which is fastened, the power unit of the tractor including an engine 12 and a transmission mechanism 13.

While the details of the latter form no part of the present invention, they may include the parts shown more particularly in Figure VI and more fully illustrated and described in my co-pending application, Serial Number 329,429, filed October 9, 1919, of which the present application is a division. In Figure VI, 14 is the crank shaft of the engine, having a fly wheel 15 partly enclosing a clutch 16 by means of which power may be transmitted from the fly wheel to a section 17 of the transmission shaft at the rear end of which is a pinion 18. The latter is bored out centrally to receive a bearing for the forward end of an intermediate section 19 of the transmission shaft. The section 19 is adapted to be locked to the section 17 by the shifting forward of a gear 20 slidable on section 19 and having clutch teeth on its forward side to engage with the teeth of the pinion 18. The rear end of the section 19 is also bored out to receive the rear section 21 of the transmission shaft, the two sections 19 and 21 being incapable of relative rotation because of a splined connection 22. The rear section 21 carries a worm 23 which meshes with a worm wheel 24, and the latter is arranged to drive shafts 25 and 26 through suitable differential mechanism, said shafts carrying at their outer ends, bull pinions 27 meshing with internal gears 28 fixed to the wheels 10 whereby the latter receive their driving impetus.

Within the casing 11 and parallel to the transmission shaft is a relatively short axle 29 upon which is rotatably mounted a sleeve 30 carrying at its forward end a gear 31 which meshes continuously with pinion 18 to provide constant rotation for the sleeve 30. This sleeve carries also gears 31' and 32 by means of which low speed and reverse respectively may be transmitted to the rear sections 19 and 21 of the transmission shaft when gear 20 is shifted from the position illustrated to rear or intermediate position, all as more particularly described in my co-pending application above referred to.

At its rear end the sleeve 30 carries a worm 33 meshing with a worm wheel 34 which is keyed to a vertical shaft 35. It will be apparent, therefore, that whenever the engine is running, the shaft 35 is turning and that its direction of rotation is always the same. The shaft 35 is mounted centrally of a partially cylindrical portion 36 of the casing 11, it being supported at the bottom in a bearing formed in the top of a casting 37 which closes the lower end of the casing portion 36 and is held in position by means of screw bolts 38 or the like. Near its upper end, this shaft rotates in a bearing formed in a casting 39 bolted to the top of the casing portion 36 as at 40.

The two castings 37 and 39 are machined in such a way as to form trunnions having axes co-incident with that of shaft 35. These trunnions support pivotally the forward ends of the arm of a yoke 41 which is so proportioned as to clear the rear end of the casing 11. Grease cups 42 may be employed if desired in order to provide proper lubrication. Extending rearwardly from the yoke 41 and in fixed relation thereto, is a beam 43 which supports a driver's seat 44, and the necessary control rods for the tractor.

A toothed sector 45 is suitably secured at its ends to portions of the casing constituting part of the forward running gear. A pinion 46 meshes with the sector 45, being fixed to a vertical shaft 47 which is rotatably mounted in a rearwardly extending portion of the yoke 41 which extends between the two halves of the beam 43 and to which those halves are riveted or otherwise fastened. The upper bearing for the shaft 47 is formed in a casting 48 which contains a cavity of sufficient size to accommodate a worm wheel 49 fast on the shaft and a worm 50. A cover 51 is bolted to the casting 48. Halved bearings, formed at the intersection of the casting and cover, rotatably receive the smooth extensions 52 and 53 of the worm 50.

The worm 50 and its extensions 52 and 53 form part of what I herein term a steering shaft. Other parts include a tubular section 54 and a solid section 55. The latter is rotatably mounted in bearings in a small casing 56 bolted to the top of the upper arm of the yoke 41. Pinned to this section 55 of the steering shaft are a pair of bearing discs 57 adapted to act as stops for a pair of bevel gears 58 free to rotate upon the shaft. A double cone clutch 59 keyed to slide on the shaft is arranged to engage internal cone surfaces on the gears 58 so as to frictionally lock either one of them against movement with respect to the shaft. A central groove in the clutch 59 receives the fingers of a clutch shifter 60 fixed upon a control rod 61 adapted to slide longitudinally in bearings provided in the casing 56 and also in a guide 63 on the top of cover 51. The gears 58 mesh continuously with a bevel gear 62 keyed to the upper end of the continuously rotating shaft 35.

The portion 52 of the steering shaft is joined at its rear end by a universal connection 64 with a section 65 which preferably is made of two telescoping parts incapable of relative rotation (see Figure I). All of the sections of the steering shaft, that is 55, 54, 53, 52, 64 and 65, are so fastened together as to prevent relative rotation. The rear section 65 is mounted in a bearing provided in the upper end of a bracket 66 secured to the beam 43 and carries a steering wheel 67. The central rod 61 is arranged to be moved forward and backward by means of an operating lever 68 pivoted in an upstanding bracket 69 secured to the trailer beam 43.

The steering of the tractor may be controlled from the driver's seat either by manual rotation of the steering shaft by means of the wheel 67, or by the manipulation of control lever 68. When steering wheel 67 is turned one way or the other, rotation is transmitted through the steering shaft to worm 50 which through worm wheel 49 and shaft 47 causes the rotation of steering pinion 46. The latter in moving over the rack 45 produces relative horizontal swinging movement between the forward running gear and the trailer about the trunnions formed on castings 37 and 39 as a center. At such time, the power steering clutch 59 is set at neutral as illustrated in Figure IV. This provision for manual steering is a convenience in the event of some mishap to the power steering apparatus, and it is also quite satisfactory for driving the tractor in a straight line as for example in holding it to the proper course in plowing or cultivating or even in driving over the road. At such times the power steering apparatus may act so quickly and energetically as to make it difficult for the driver to hold a steady course.

When it is desired to make use of the power steering apparatus, the control handle 68 being set in an intermediate position so that the clutch 59 is not in engagement with either of the bevel gears 58, the operator pulls the lever 68 towards himself to steer in one direction, let us say to the left. Thereupon the rod 61 moves backwardly and the clutch 59 engages the rear bevel gear 58. This causes power to be transmitted from the continuously moving shaft 35 to bevel gear 62 and rear bevel gear 58 and clutch 59 to the steering shaft and thence through the worm and worm wheel 50, 49 and shaft 47 to steering pinion 46. When the turn is completed the lever 68 is shifted to forward position until the trailer and front running gear come again into parallelism, and the tractor continues on a straight course. To steer in the opposite direction, the lever 68 is pushed forward to cause clutch 59 to engage the forward gear 58 and the reverse operation of course takes place.

While the embodiment of the invention illustrated herein is shown and described in considerable detail, it is to be understood that this showing and description is illustrative only and for the purpose of rendering the invention more clear, and that it is not my intention to limit the invention to the preferred details of construction illustrated or described, except in so far as such limitations are included within the terms of the following claims, in which it is my intention to claim all novelty inherent in my invention broadly as well as specifically.

Having thus described my invention, what I claim as new and desire to secure by Letters Patent, is:

1. In a self propelled vehicle having driving wheels and a driving motor, steering mechanism therefor comprising a shaft having a hand wheel at one end thereof, an oscillatable steering member, means for operatively connecting said member with an intermediate part of said shaft, means at the other end of said shaft for connecting the same with said motor to be rotated thereby in either direction independently of said driving wheels, and means independent of said hand wheel for controlling the aforesaid means connecting the motor and the shaft.

2. In a motor vehicle, a trailer, running gear mounted to swing about a vertical pivot with respect to said trailer, a steering sector fixed upon said running gear, a steering pinion rotatably mounted upon said trailer in mesh with said sector, an engine mounted upon said running gear, and a continuously revolving shaft in vertical alignment with said pivot, and operable connections mounted upon said trailer adapted to transmit power in either direction from said shaft to said pinion.

3. In a tractor, a trailer including a yoke, running gear, an engine mounted thereon, vertically aligned pivotal connections between said yoke and running gear, a toothed sector fixed upon said running gear, a steering pinion rotatably mounted upon said trailer in mesh with said sector, a continuously revolving shaft mounted concentric with the said pivotal connections, and operable connections mounted upon said trailer adapted to transmit power in either direction from said shaft to said pinion.

4. In a tractor, a running gear, a power unit, a casing therefor supported by said running gear, a trailer having at its forward end a yoke with two arms extending forwardly above and below said casing, vertically aligned pivotal connections between the extremities of said arms and said casing, a continuously rotating vertical shaft mounted in said casing concentrically with said pivotal connections and extending through one of the latter, a toothed sector fixed upon said running gear, a steering pinion rotatably mounted upon said trailer in mesh with said sector, and operable connections mounted upon said trailer adapted to transmit power from the exposed end of said shaft to said pinion.

5. In a tractor, a running gear, a power unit, a casing therefor supported by said running gear, a trailer having at its forward end a yoke with two arms extending forwardly above and below said casing, vertically aligned pivotal connections between the extremities of said arms and said casing, a continuously rotating vertical shaft mounted in said casing concentrically with said pivotal connections and extending through one of the latter, a toothed sector fixed upon said running gear, a steering pinion rotatably mounted upon said trailer in mesh with said sector, and operable connections mounted upon said trailer adapted to transmit power from the exposed end of said shaft to said pinion, said operable connections including means for reversing and disconnecting the drive to said pinion.

6. In a tractor, a running gear, a power unit, a casing therefor supported by said running gear, a trailer having at its forward end a yoke with two arms extending forwardly above and below said casing, vertically aligned pivotal connections between the extremities of said arms and said casing, a continuously rotating vertical shaft mounted in said casing concentrically with said pivotal connections and extending through one of the latter, a toothed sector fixed upon said running gear, a steering pinion rotatably mounted upon said trailer in mesh with said sector, and operable connections mounted upon said trailer adapted to transmit power from the exposed end of said shaft to said pinion, said operable connections including means located substantially in alignment with said shaft for reversing and disconnecting the drive to said pinion.

7. In a tractor, a running gear, a power unit, a casing therefor supported by said running gear, a trailer having at its forward end a yoke with two arms extending forwardly above and below said casing, vertically aligned pivotal connections between the extremities of said arms and said casing, a continuously rotating vertical shaft mounted in said casing concentrically with said pivotal connections and extending through one of the latter, a toothed sector fixed upon said running gear, a steering pinion rotatably mounted upon said trailer in mesh with said sector, and operable connections mounted upon said trailer adapted to transmit power from the exposed end of said shaft to said pinion, said operable connections including a rearwardly extending steering shaft, and means upon said steering shaft adapted to be operated by the driver for manually steering the tractor.

8. In a tractor, runing gear, a power unit mounted thereon, a trailer connected with said runing gear by a vertical pivot connection, a pinion and a toothed sector carried respectively by said trailer and running gear, a continuously rotating driving element mounted in alignment with said pivotal connection, operable connections between said driving element and said pinion, said connections including reversing and disconnecting means also located in alignment with said pivotal connection, an operator's seat on said trailer, and a control rod extending rearwardly from said reversing and disconnecting means to a position within reach of the operator.

In testimony whereof, I affix my signature.

EDWARD H. BELDEN.